(12) United States Patent  
Lee et al.

(10) Patent No.: US 9,145,951 B2  
(45) Date of Patent: Sep. 29, 2015

(54) POWER TRANSMITTING APPARATUS FOR VEHICLE

(71) Applicant: Hyundai Motor Company, Seoul (KR)

(72) Inventors: Sueng Ho Lee, Seoul (KR); Chang Wook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/099,747

(22) Filed: Dec. 6, 2013

(65) Prior Publication Data

US 2015/0059504 A1 Mar. 5, 2015

(30) Foreign Application Priority Data

Aug. 27, 2013 (KR) ........................ 10-2013-0101803

(51) Int. Cl.
*F16H 3/08* (2006.01)
*F16H 3/00* (2006.01)
*F16H 3/093* (2006.01)

(52) U.S. Cl.
CPC ........ *F16H 3/006* (2013.01); *F16H 2003/0931* (2013.01); *F16H 2200/0056* (2013.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 7,155,994 B2 | 1/2007 | Gumpoltsberger | |
| 7,340,973 B2 * | 3/2008 | Hiraiwa | 74/330 |
| 7,383,749 B2 | 6/2008 | Schäfer et al. | |
| 8,522,635 B2 * | 9/2013 | Pastorello et al. | 74/335 |
| 8,573,085 B2 * | 11/2013 | Mizuno et al. | 74/331 |
| 2007/0240530 A1 * | 10/2007 | Ogami et al. | 74/330 |
| 2012/0160044 A1 * | 6/2012 | Kahl | 74/330 |
| 2014/0109704 A1 * | 4/2014 | Machida et al. | 74/330 |
| 2014/0157923 A1 * | 6/2014 | Lee et al. | 74/330 |

* cited by examiner

*Primary Examiner* — Ha D Ho  
(74) *Attorney, Agent, or Firm* — Morgan, Lewis & Bockius LLP

(57) ABSTRACT

A power transmitting apparatus for a vehicle may include a variable connecting device including a first clutch and a second clutch and selectively outputting torque of an engine through the first clutch and/or the second clutch, an input device including first and second input shafts selectively connected to the engine through the first and second clutches, and a speed output device including a first output shaft, a first speed output unit with first and second synchronizer modules, a second output shaft, and a second speed output unit with third, fourth, and fifth synchronizer modules. In the power transmitting apparatus, one seventh speed gear engaged with any one input gear on the first input shaft and another seventh speed gear engaged with any one input gear on the second input shaft are disposed on the first or second output shaft.

9 Claims, 2 Drawing Sheets

FIG. 2

| | CL1 | CL2 | SL1 | | | SL2 | | | SL3 | | | | SL4 | | SL5 | | |
|---|---|---|---|---|---|---|---|---|---|---|---|---|---|---|---|---|---|
| | | | D1 | N | D3 | D2 | N | D4 | D6 | N | R | RG5 | N | D7-1 | N | D7-2 | |
| R | ● | | | ○ | | ● | | | | | ● | | ○ | | ○ | | |
| 1ST | | ● | ● | | | | ○ | | | ○ | | | ○ | | | ● | |
| 2ND | ● | | | ○ | | ● | | | | ● | | | ○ | | ○ | | |
| 3RD | | ● | | | ● | | ○ | | | ○ | | | ○ | | | ● | |
| 4TH | ● | | | ○ | | | | ● | | ● | | | ○ | | ○ | | |
| 5TH | | ● | ● | | | | ○ | | | | | ● | | ● | | ● | |
| 6TH | ● | | | ○ | | ● | | | ● | | | | ○ | | ○ | | |
| 7TH | | ● | ● | | | | ○ | | | ○ | | | ○ | | | ● | Used in shift to odd-numbered speed |
| 7TH | ● | | | ○ | | ● | | | | ● | | | | ● | ○ | | Used in shift to even-numbered speed |
| | ● | ● | ● | | | ● | | | | ● | | | | ● | | ● | At normal 7TH |

POWER TRANSMITTING APPARATUS FOR VEHICLE

CROSS-REFERENCE TO RELATED APPLICATION

The present application claims priority of Korean Patent Application Number 10-2013-0101803 filed on Aug. 27, 2013, the entire contents of which application are incorporated herein for all purposes by this reference.

BACKGROUND OF INVENTION

1. Field of Invention

The present invention relates to a double clutch power transmitting apparatus. More particularly, the present invention relates to a power transmitting apparatus for a vehicle which improves mountability by minimizing a length of the power transmitting apparatus, enhances drivability and fuel economy by preventing distortion of step ratios, and further enhances drivability by enabling of skip shift from the highest shift-speed to a specific shift-speed.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations. Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque. Such a DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency, and change and addition of components is very easy in the DCT. Therefore, the DCT can meet fuel consumption regulations and multi-speeds efficiency may be improved.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a power transmitting apparatus for a vehicle having advantages of improving mountability by minimizing a length of the power transmitting apparatus, enhancing drivability and fuel economy by preventing distortion of step ratios, and further enhancing drivability by enabling of skip shift from the highest shift-speed to a specific shift-speed.

A power transmitting apparatus for a vehicle according to various aspects of the present invention may include: a variable connecting device including a first clutch and a second clutch and selectively outputting torque of an engine through the first clutch and/or the second clutch; an input device including a first input shaft selectively connected to the engine through the first clutch and provided with first, second, and third input gears fixedly disposed on an exterior circumference thereof, and a second input shaft selectively connected to the engine through the second clutch and provided with fourth, fifth, and sixth input gears fixedly disposed on an exterior circumference thereof; and a speed output device including a first output shaft disposed substantially in parallel with the first and second input shafts, a first speed output unit provided with first and second synchronizer modules disposed on the first output shaft, a second output shaft disposed substantially in parallel with the first and second input shafts, and a second speed output unit provided with third, fourth, and fifth synchronizer modules disposed on the second output shaft, wherein one seventh speed gear engaged with any one input gear on the first input shaft and another seventh speed gear engaged with any one input gear on the second input shaft are disposed on the first or second output shaft.

The power transmitting apparatus may further include a reverse speed device including a reverse speed shaft and an idle gear and a reverse input gear fixedly disposed on the reverse speed shaft, wherein the reverse input gear is engaged with any one input gear on the first and second input shafts and the idle gear is engaged with any one synchronizer module disposed on the second output shaft.

The first input shaft may be a hollow shaft and the first, second, and third input gears may be disposed on the exterior circumference of the first input shaft rearward in a named sequence. At least a portion of the second input shaft may be inserted in the first input shaft, and the fourth, fifth, and sixth input gears may be disposed on a portion of the second input shaft rearward in a named sequence.

The first synchronizer module may include a first speed gear engaged with the fourth input gear and a third speed gear engaged with the fifth input gear. The second synchronizer module may include a second speed gear engaged with the first input gear and a fourth speed gear engaged with the third input gear. The third synchronizer module may include a reverse speed gear engaged with the idle gear of the reverse speed device and a sixth speed gear engaged with the second input gear. The fourth synchronizer module may include the one seventh speed gear engaged with the third input gear and a fifth speed gear engaged with the fifth input gear. The fifth synchronizer module may include the another seventh speed gear engaged with the sixth input gear.

A power transmitting apparatus for a vehicle according to various aspects of the present invention may include: a first clutch connected to an engine and selectively outputting torque of the engine; a second clutch connected to the engine and selectively outputting the torque of the engine; a first input shaft being a hollow shaft, selectively receiving the torque of the engine through the first clutch, and provided with first, second, and third input gears disposed on an exterior circumference thereof; a second input shaft penetrating the first input shaft without rotational interference therebetween, selectively receiving the torque of the engine through the second clutch, and provided with fourth, fifth, and sixth input gears disposed on an exterior circumference thereof; first and second output shafts disposed substantially in parallel with the first and second input shafts; a first synchronizer module disposed on the first output shaft, and including a first speed gear engaged with the fourth input gear and a third speed gear engaged with the fifth input gear; a second synchronizer module disposed on the first output shaft, and including a second speed gear engaged with the first input gear and a fourth speed gear engaged with the third input gear;

a third synchronizer module disposed on the second output shaft, and including a sixth speed gear engaged with the second input gear and a reverse speed gear engaged with an idle gear, wherein the idle gear is connected through a reverse speed shaft to a reverse input gear that is engaged with the first input gear; a fourth synchronizer module disposed on the second output shaft, and including one seventh speed gear engaged with the third input gear and a fifth speed gear engaged with the fifth input gear; and a fifth synchronizer module disposed on the second output shaft and including another seventh speed gear engaged with the sixth input gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of an exemplary power transmitting apparatus for a vehicle according to the present invention.

DETAILED DESCRIPTION

Figure 1:
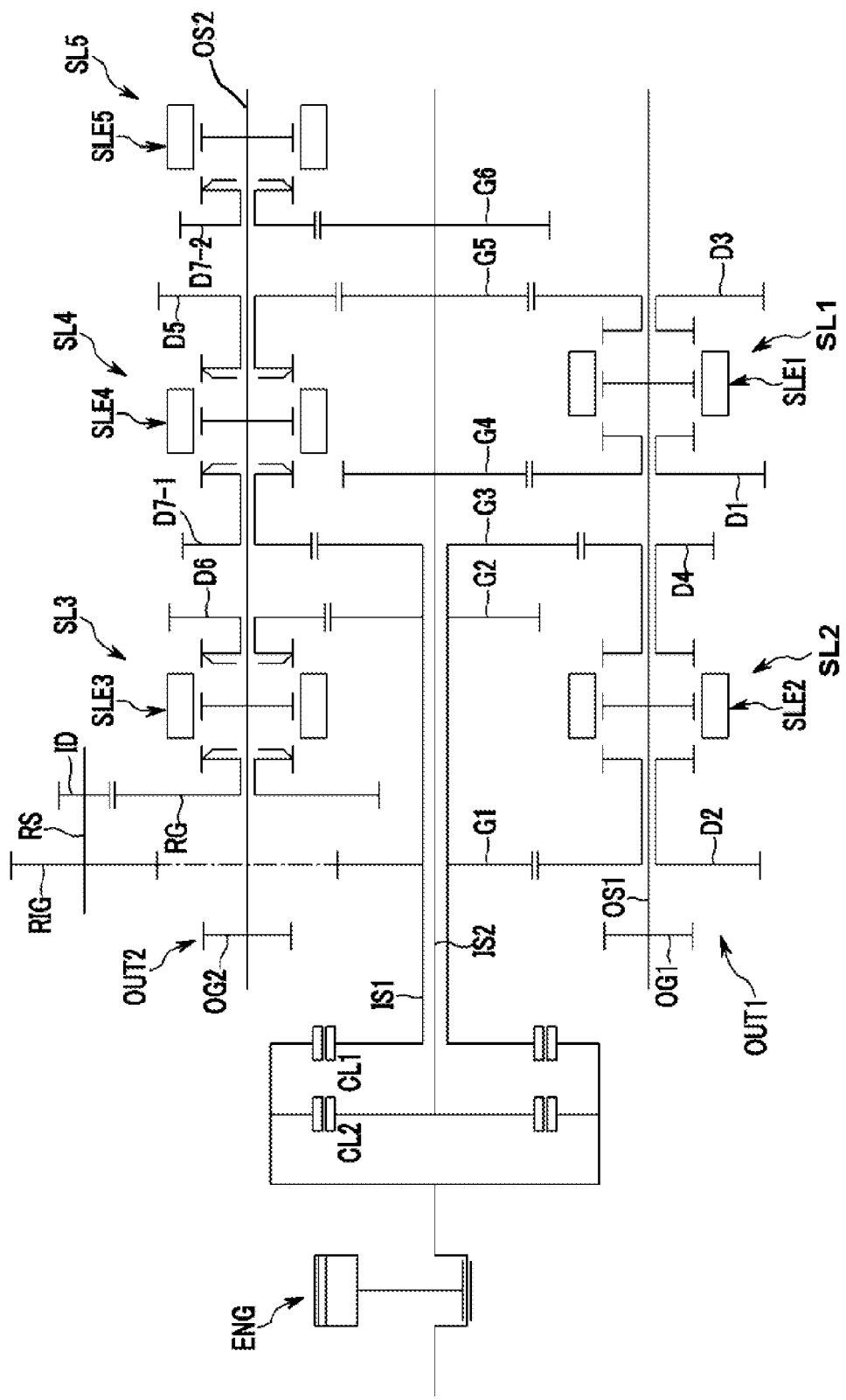
FIG. 1 is a schematic diagram of an exemplary power transmitting apparatus for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various exemplary embodiments will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a power transmitting apparatus for a vehicle according to various embodiments of the present invention. Referring to FIG. 1, a power transmitting apparatus according to various embodiments of the present invention includes a variable connecting device CL1 and CL2, an input device IS1 and IS2, a speed output device OUT1 and OUT2, and a reverse speed device RS, ID, and RIG.

The variable connecting device includes first and second clutches CL1 and CL2. The first clutch CL1 and the second clutch CL2 selectively transmits torque of an engine ENG that is a power source respectively to first and second input shafts IS1 and IS2.

The first clutch CL1 selectively connects the first input shaft IS1 with an output side of the engine ENG, and the second clutch CL2 selectively connects the second input shaft IS2 with the output side of the engine ENG. The first and second clutches CL1 and CL2 forming the variable connecting device may be conventional multi-plate clutches of wet type, and are controlled by a hydraulic control system.

The input device includes the first and second input shafts IS1 and IS2. The first input shaft IS1 is a hollow shaft, and a front end portion of the first input shaft IS1 is selectively connected to the output side of the engine ENG through the first clutch CL1. In addition, first, second, and third input gears G1, G2, and G3 are disposed on the first input shaft IS1 with predetermined distances in a named sequence from a front portion to a rear portion, e.g., rearward.

The second input shaft IS2 is inserted in the first input shaft IS1 without rotational interference with the first input shaft IS1. A front end portion of the second input shaft IS2 is selectively connected to the output side of the engine ENG through the second clutch CL2. In addition, fourth, fifth, and sixth input gears G4, G5, and G6 are disposed on the second input shaft IS2 with predetermined distances. The fourth, fifth, and sixth input gears G4, G5, and G6 are positioned at a portion, for example, a rear portion of the second input shaft IS2 penetrating the first input shaft IS1 and are disposed in a sequence of the fourth, fifth, and sixth input gears G4, G5, and G6 from a front portion to a rear portion, e.g., rearward.

The first, second, third, fourth, fifth, and sixth input gears G1, G2, G3, G4, G5, and G6 are input gears operating at a respective speed. That is, the first input gear G1 is operated at a second forward speed and a reverse speed, the second input gear G2 is operated at a sixth forward speed, the third input gear G3 is operated at a fourth forward speed and an even-numbered seventh forward speed, the fourth input gear G4 is operated at a first forward speed, the fifth input gear G5 is operated at a third forward speed and a fifth forward speed, and the sixth input gear G6 is operated at an odd-numbered seventh forward speed. That is, the input gears for even-numbered speeds and the reverse speed are disposed on the first input shaft IS1, and the input gears for odd-numbered speeds are disposed on the second input shaft IS2.

The speed output device is adapted to receive torque from each input gear of the input device, convert torque, and output the converted torque. The speed output device includes first and second speed output units OUT1 and OUT2 disposed in parallel or substantially in parallel with the first and second input shafts IS1 and IS2.

The first speed output unit OUT1 includes a first output shaft OS1 disposed in parallel with the first and second input shafts IS1 and IS2, a first synchronizer module SL1 including a first speed gear D1 and a third speed gear D3, and a second synchronizer module SL2 including a second speed gear D2 and a fourth speed gear D4. The first synchronizer module SL1 is disposed on a rear portion of the first output shaft OS1 and the second synchronizer module SL2 is disposed on a front portion of the first output shaft OS1.

The first speed gear D1 of the first synchronizer module SL1 is engaged with the fourth input gear G4, and the third speed gear D3 of the first synchronizer module SL1 is engaged with the fifth input gear G5. The second speed gear D2 of the second synchronizer module SL2 is engaged with the first input gear G1, and the fourth speed gear D4 of the second synchronizer module SL2 is engaged with the third input gear G3. In addition, the torque converted by the first speed output unit OUT1 is transmitted to a conventional differential device through a first output gear OG1 mounted at a front end portion of the first output shaft OS1.

The second speed output unit OUT2 includes a second output shaft OS2 disposed in parallel with the first and second input shafts IS1 and IS2, a third synchronizer module SL3 including a reverse speed gear RG and a sixth speed gear D6, a fourth synchronizer module SL4 including one seventh speed gear D7-1 and a fifth speed gear D5, and a fifth synchronizer module SL5 including another seventh speed gear D7-2. Herein, the two seventh speed gears D7-1 and D7-2 are disposed at even-numbered shift-speeds side and odd-numbered shift-speeds side, respectively.

The third, fourth, and fifth synchronizer modules SL3, SL4, and SL5 are disposed on the second output shaft OS2 in a named sequence from a front portion to a rear portion.

The reverse speed gear RG of the third synchronizer module SL3 is engaged with an idle gear ID of the reverse speed device, and the sixth speed gear D6 of the third synchronizer module SL3 is engaged with the second input gear G2. The one seventh speed gear D7-1 of the fourth synchronizer module SL4 is engaged with the third input gear G3, and the fifth speed gear D5 of the fourth synchronizer module SL4 is engaged with the fifth input gear G5. The another seventh speed gear D7-2 of the fifth synchronizer module SL5 is engaged with the sixth input gear G6.

In addition, the torque converted by the second speed output unit OUT2 is transmitted to the conventional differential device through the second output gear OG2 mounted at a front end portion of the second output shaft OS2. Total gear ratio of the third input gear G1 and the one seventh speed gear D7-1 is the same or substantially the same as that of the sixth input gear G6 and the another seventh speed gear D7-2.

The reverse speed device includes a reverse speed shaft RS disposed in parallel with the second output shaft OS2 and the idle gear ID and a reverse input gear RIG integrally formed with the reverse speed shaft RS. One will appreciate that such integral components may be monolithically formed. The reverse input gear RIG is engaged with the first input gear G1 and the idle gear ID is engaged with the reverse speed gear RG. Therefore, if the first input shaft IS1 rotates, torque of the first input gear G1 is transmitted to the reverse speed gear RG as an inverse rotation speed.

Since the first, second, third, fourth, and fifth synchronizer modules SL1, SL2, SL3, SL4, and SL5 are known in the art, detailed description thereof will be omitted. Sleeves SLE1, SLE2, SLE3, SLE4, and SLE5 applied respectively to the first, second, third, fourth, and fifth synchronizer modules SL1, SL2, SL3, SL4, and SL5, as known in the art, are operated by additional actuators and the actuators are controlled by a transmission control unit.

FIG. 2 is an operational chart of a power transmitting apparatus for a vehicle according to various embodiments of the present invention.

Reverse Speed

At the reverse speed R, as shown in FIG. 2, the second output shaft OS2 and the reverse speed gear RG are operably connected by the sleeve SEL3 of the third synchronizer module SL3. After that, the first clutch CL1 is operated. Then, shift to the reverse speed is completed.

First Forward Speed

At the first forward speed $1^{ST}$, as shown in FIG. 2, the first speed gear D1 and the first output shaft OS1 are operably connected by the sleeve SEL1 of the first synchronizer module SL1. After that, the second clutch CL2 is operated. Then, shift to the first forward speed is completed.

Second Forward Speed

If vehicle speed increases at the first forward speed $1^{ST}$ and shift to the second forward speed $2^{ND}$ is necessary, as shown in FIG. 2, the second speed gear D2 and the first output shaft OS1 are operably connected by the sleeve SEL2 of the second synchronizer module SL2. After that, the second clutch CL2 is released and the first clutch CL1 is operated. Then, the shift to the second forward speed is completed. After the shift to the second forward speed is completed, the sleeve SEL1 of the first synchronizer module SL1 is moved to a neutral position.

Third Forward Speed

If the vehicle speed increases at the second forward speed $2^{ND}$ and shift to the third forward speed $3^{RD}$ is necessary, as shown in FIG. 2, the third speed gear D3 and the first output shaft OS1 are operably connected by the sleeve SEL1 of the first synchronizer module SL1. After that, the first clutch CL1 is released and the second clutch CL2 is operated. Then, the shift to the third forward speed is completed. After the shift to the third forward speed is completed, the sleeve SEL2 of the second synchronizer module SL2 is moved to a neutral position.

Fourth Forward Speed

If the vehicle speed increases at the third forward speed $3^{RD}$ and shift to the fourth forward speed $4^{TH}$ is necessary, as shown in FIG. 2, the fourth speed gear D4 and the first output shaft OS1 are operably connected by the sleeve SEL2 of the second synchronizer module SL2. After that, the second clutch CL2 is released and the first clutch CL1 is operated. Then, the shift to the fourth forward speed is completed. After the shift to the fourth forward speed is completed, the sleeve SEL1 of the first synchronizer module SL1 is moved to a neutral position.

Fifth Forward Speed

If the vehicle speed increases at the fourth forward speed $4^{TH}$ and shift to the fifth forward speed $5^{TH}$ is necessary, as shown in FIG. 2, the fifth speed gear D5 and the second output shaft OS2 are operably connected by the sleeve SEL4 of the fourth synchronizer module SL4. After that, the first clutch CL1 is released and the second clutch CL2 is operated. Then, the shift to the fifth forward speed is completed. After the shift to the fifth forward speed is completed, the sleeve SEL2 of the second synchronizer module SL2 is moved to a neutral position.

Sixth Forward Speed

If the vehicle speed increases at the fifth forward speed $5^{TH}$ and shift to the sixth forward speed $6^{TH}$ is necessary, as shown in FIG. 2, the sixth speed gear D6 and the second output shaft OS2 are operably connected by the sleeve SEL3 of the third synchronizer module SL3. After that, the second clutch CL2 is released and the first clutch CL1 is operated. Then, the shift to the sixth forward speed is completed. After the shift to the sixth forward speed is completed, the sleeve SEL4 of the fourth synchronizer module SL4 is moved to a neutral position.

Seventh Forward Speed

If the vehicle speed increases at the sixth forward speed $6^{TH}$ and shift to the seventh forward speed $7^{TH}$ is necessary, as shown in FIG. 2, the first clutch CL1 is released, and the one seventh speed gear D7-1 and another seventh speed gear D7-2 are operably connected to the second output shaft OS2 by the sleeve SEL4 of the fourth synchronizer module SL4 and the sleeve SEL5 of the fifth synchronizer module SL5. After that, the first and second clutches CL1 and CL2 are simultaneously operated. Then, the shift to the seventh forward speed is completed. That is, the one seventh speed gear D7-1 and another seventh speed gear D7-2 are connected to the second output shaft OS2 at the normal seventh forward speed.

In addition, the power transmitting apparatus according to various embodiments of the present invention can perform skip shift from the seventh forward speed to the first forward speed, the second forward speed, the third forward speed, the fourth forward speed, or the fifth forward speed.

In further detail, if the skip shift from the seventh forward speed to the odd-numbered speed (e.g., the first forward speed, the third forward speed or the fifth forward speed) is performed, a vehicle runs with the seventh forward speed by operating the first clutch CL1 in a state that the one seventh speed gear D7-1 and the second output shaft OS2 are connected. In contrast, if the skip shift from the seventh forward speed to the even-numbered speed (e.g., the second forward speed or the fourth forward speed) is performed, the vehicle runs with the seventh forward speed by operating the second clutch CL2 in a state that another seventh speed gear D7-2 and the second output shaft OS2 are connected.

That is, if the skip shift from the seventh forward speed to the odd-numbered speed or from the odd-numbered speed to the seventh forward speed is performed, the first speed gear D1 or the third speed gear D3 is operably connected to the first output shaft OS1 in a state that the one seventh speed gear D7-1 and the first clutch CL1 are operated. After that, the first clutch CL1 is released and the second clutch CL2 is operated such that the skip shift to the first forward speed or the third forward speed is performed. After the skip shift to the first forward speed or the third forward speed is completed, the fourth sleeve SEL4 connecting the one seventh speed gear D7-1 and the second output shaft OS2 is moved to the neutral position.

In addition, the skip shift from the seventh forward speed to the fifth forward speed is also possible. This is because the fifth speed gear D5 as well as the seventh speed gear D7-1 is disposed on the second output shaft OS2 but the second clutch CL2 is released. After the first clutch CL1 is released, the fourth sleeve SLE4 is operably connected to the fifth speed gear D5. After that, if the second clutch CL2 is operated, the skip shift from the seventh forward speed to the fifth forward speed is performed.

In addition, if the skip shift from the seventh forward speed to the even-numbered speed or from the even-numbered speed to the seventh forward speed is performed, the second speed gear D2 or the fourth speed gear D4 is operably connected to the first output shaft OS1 in a state that another seventh speed gear D7-2 and the second clutch CL2 are operated. After that, if the second clutch CL2 is released and the first clutch CL1 is operated such that the skip shift to the second forward speed or the fourth forward speed is performed. After the skip shift from the seventh forward speed to the second forward speed or the fourth forward speed is completed, the fifth sleeve SEL5 connecting another seventh speed gear D7-2 and the second output shaft OS2 is moved to the neutral position.

In the power transmitting apparatus according to various embodiments of the present invention, the fourth speed gear D4 and the one seventh speed gear D7-1 are simultaneously engaged to the third input gear G3 and the third speed gear D3 and the fifth speed gear D5 are simultaneously engaged to the fifth input gear G5.

Since seven forward speeds can be achieved but the number of input gears disposed on the input shafts can be minimized, a length of a transmission may be reduced. Therefore, layout change of engine compartments and other design change may be prevented.

In addition, step ratios between shift-speeds are large at a low-speed region where higher output is necessary but are small at a high-speed region where quick shift and driving efficiency is necessary. The fourth speed gear D4 and the one seventh speed gear D7-1 having comparatively large gear ratio difference therebetween are simultaneously engaged to the third input gear G3, and the third speed gear D3 and the fifth speed gear D5 having comparatively large gear ratio difference therebetween are simultaneously engaged to the fifth input gear G5 in various embodiments of the present invention. Therefore, drivability and fuel economy may be improved by preventing distortion of step ratios at the high-speed region.

In addition, since two clutches CL1 and CL2 are operated at the seventh forward speed, drag torque of the clutches is not generated. Therefore, fuel economy may be improved. In addition, since the synchronizer modules for achieving the seventh forward speed that is the highest shift-speed are provided respectively on the odd-numbered speed side and the even-numbered speed side, skip shift can be performed. Therefore, drivability may be improved.

It is exemplified in this specification that the speed gears for achieving the highest shift-speed are provided respectively on the odd-numbered speed side and the even-numbered speed side, but the present invention is not limited thereto.

For convenience in explanation and accurate definition in the appended claims, the terms "front" or "rear", interior" or "exterior", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus for a vehicle comprising:
    a variable connecting device including a first clutch and a second clutch and selectively outputting torque of a power source through the first clutch and/or the second clutch;
    an input device including a first input shaft selectively connected to the power source through the first clutch and provided with first, second, and third input gears fixedly disposed on an exterior circumference thereof, and a second input shaft selectively connected to the power source through the second clutch and provided with fourth, fifth, and sixth input gears fixedly disposed on an exterior circumference thereof; and
    a speed output device including a first output shaft disposed substantially in parallel with the first and second input shafts, a first speed output unit provided with first and second synchronizer modules disposed on the first output shaft, a second output shaft disposed substantially in parallel with the first and second input shafts, and a second speed output unit provided with third, fourth, and fifth synchronizer modules disposed on the second output shaft,
    wherein one seventh speed gear engaged with one of the first, second, and third input gears on the first input shaft and another seventh speed gear engaged with one of the fourth, fifth, and sixth input gears on the second input shaft are disposed on the first output shaft or the second output shaft.

2. The power transmitting apparatus of claim 1, further comprising a reverse speed device including a reverse speed shaft and an idle gear and a reverse input gear fixedly disposed on the reverse speed shaft, wherein the reverse input gear is engaged with any one input gear on the first and second input shafts and the idle gear is engaged with any one synchronizer module disposed on the second output shaft.

3. The power transmitting apparatus of claim 2, wherein the first input shaft is a hollow shaft and the first, second, and third input gears are disposed on the exterior circumference of the first input shaft rearward in a named sequence, and
  at least a portion of the second input shaft is inserted in the first input shaft, and the fourth, fifth, and sixth input gears are disposed on a portion of the second input shaft rearward in a named sequence.

4. The power transmitting apparatus of claim 3, wherein the first synchronizer module includes a first speed gear engaged with the fourth input gear and a third speed gear engaged with the fifth input gear.

5. The power transmitting apparatus of claim 3, wherein the second synchronizer module includes a second speed gear engaged with the first input gear and a fourth speed gear engaged with the third input gear.

6. The power transmitting apparatus of claim 3, wherein the third synchronizer module includes a reverse speed gear engaged with the idle gear of the reverse speed device and a sixth speed gear engaged with the second input gear.

7. The power transmitting apparatus of claim 3, wherein the fourth synchronizer module includes the one seventh speed gear engaged with the third input gear and a fifth speed gear engaged with the fifth input gear.

8. The power transmitting apparatus of claim 3, wherein the fifth synchronizer module includes the another seventh speed gear engaged with the sixth input gear.

9. A power transmitting apparatus for a vehicle comprising:
  a first clutch connected to a power source and selectively outputting torque of the power source;
  a second clutch connected to the power source and selectively outputting the torque of the power source;
  a first input shaft being a hollow shaft, selectively receiving the torque of the power source through the first clutch, and provided with first, second, and third input gears disposed on an exterior circumference thereof;
  a second input shaft penetrating the first input shaft without rotational interference therebetween, selectively receiving the torque of the power source through the second clutch, and provided with fourth, fifth, and sixth input gears disposed on an exterior circumference thereof;
  first and second output shafts disposed substantially in parallel with the first and second input shafts;
  a first synchronizer module disposed on the first output shaft, and including a first speed gear engaged with the fourth input gear and a third speed gear engaged with the fifth input gear;
  a second synchronizer module disposed on the first output shaft, and including a second speed gear engaged with the first input gear and a fourth speed gear engaged with the third input gear;
  a third synchronizer module disposed on the second output shaft, and including a sixth speed gear engaged with the second input gear and a reverse speed gear engaged with an idle gear, wherein the idle gear is connected through a reverse speed shaft to a reverse input gear that is engaged with the first input gear;
  a fourth synchronizer module disposed on the second output shaft, and including one seventh speed gear engaged with the third input gear and a fifth speed gear engaged with the fifth input gear; and
  a fifth synchronizer module disposed on the second output shaft and including another seventh speed gear engaged with the sixth input gear.

\* \* \* \* \*